US008199898B2

(12) United States Patent
Beathard et al.

(10) Patent No.: US 8,199,898 B2
(45) Date of Patent: *Jun. 12, 2012

(54) SYSTEM AND METHOD FOR ROUTING CALLS ACROSS CALL MANAGERS USING A ROUTE PLAN

(75) Inventors: Roger V. Beathard, McKinney, TX (US); Clint D. Entrop, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 981 days.

This patent is subject to a terminal disclaimer.

(21) Appl. No.: 12/185,925

(22) Filed: Aug. 5, 2008

(65) Prior Publication Data

US 2008/0292088 A1    Nov. 27, 2008

Related U.S. Application Data

(63) Continuation of application No. 09/579,331, filed on May 25, 2000, now Pat. No. 7,412,051.

(51) Int. Cl.
*H04M 7/00* (2006.01)
*H04M 3/42* (2006.01)
*H04L 12/66* (2006.01)

(52) U.S. Cl. .............. 379/219; 379/212.01; 379/220.01; 379/221.01; 379/221.14; 370/352

(58) Field of Classification Search ............ 379/221.14, 379/112.01, 219, 212.01, 220.01, 221.01, 379/221.08, 114.02, 207.02, 216.01; 370/352, 370/408, 353
See application file for complete search history.

(56) References Cited

U.S. PATENT DOCUMENTS

| 4,748,658 | A | 5/1988 | Gopal et al. |
| 4,757,267 | A | 7/1988 | Riskin |
| 4,797,915 | A | 1/1989 | Bowker et al. |
| 5,068,892 | A | 11/1991 | Livanos |
| 5,430,792 | A | 7/1995 | Jesurum et al. |
| 5,652,866 | A | 7/1997 | Aldred et al. |
| 5,790,647 | A | 8/1998 | Gessel |
| 5,867,494 | A | 2/1999 | Krishnaswamy et al. |
| 5,950,198 | A | 9/1999 | Fallas et al. |
| 6,144,727 | A | 11/2000 | Mashinsky |

(Continued)

OTHER PUBLICATIONS

Cisco Systems, Inc.; "System Description for the Cisco Communications Network Version 2.1;" Cisco Communications Network; all, 1997.

*Primary Examiner* — Thjuan K Addy
(74) *Attorney, Agent, or Firm* — Baker Botts L.L.P.

(57) ABSTRACT

A call manager includes a first device process that controls a first telephony device and that receives a call request from the first telephony device. The call request includes a telephone number associated with a second telephony device. The call manager also includes a call control module that receives the call request from the first device process, and the call manager further includes a route list control process that is associated with the telephone number and that receives the call request from the call control module. The route list process accesses a route list to determine a port of a gateway device that can transmit the call request to the second telephony device. The route list process communicates the call request to a second call manager that is coupled to the packet-based network and that controls the gateway device included in the route list.

20 Claims, 6 Drawing Sheets

U.S. PATENT DOCUMENTS

| | | |
|---|---|---|
| 6,161,008 A | 12/2000 | Lee et al. |
| 6,205,214 B1 | 3/2001 | Culli et al. |
| 6,259,779 B1 | 7/2001 | Council et al. |
| 6,275,574 B1 | 8/2001 | Oran |
| 6,282,194 B1 | 8/2001 | Cheesman et al. |
| 6,304,574 B1 | 10/2001 | Schoo et al. |
| 6,304,576 B1 | 10/2001 | Corley et al. |
| 6,353,610 B1 | 3/2002 | Bhattacharya et al. |
| 6,363,065 B1 | 3/2002 | Thornton et al. |
| 6,366,576 B1 | 4/2002 | Haga |
| 6,389,130 B1 | 5/2002 | Shenoda et al. |
| 6,498,791 B2 | 12/2002 | Pickett et al. |
| 6,522,732 B1 | 2/2003 | Pullen et al. |
| 6,560,326 B1 | 5/2003 | Clark |
| 6,570,855 B1 | 5/2003 | Kung et al. |
| 6,574,012 B1 | 6/2003 | Kagawa |
| 6,584,093 B1 | 6/2003 | Salama et al. |
| 6,597,687 B1 | 7/2003 | Rao |
| 6,614,780 B2 | 9/2003 | Hakim et al. |
| 6,614,902 B1 | 9/2003 | Rizzetto |
| 6,657,989 B1 | 12/2003 | Hilsenrath |
| 6,671,262 B1 | 12/2003 | Kung et al. |
| 6,711,159 B1 | 3/2004 | Grabelsky et al. |
| 6,718,482 B2 | 4/2004 | Sato et al. |
| 6,751,459 B1 | 6/2004 | Lee et al. |
| 6,760,324 B1 | 7/2004 | Scott et al. |
| 6,760,416 B1 | 7/2004 | Banks et al. |
| 6,785,223 B1 | 8/2004 | Korpi et al. |
| 6,798,767 B1 | 9/2004 | Alexander et al. |
| 6,925,076 B1 | 8/2005 | Dalgic et al. |
| 7,142,650 B1 * | 11/2006 | Kult et al. ............... 379/112.01 |
| 2002/0150080 A1 | 10/2002 | Bhattacharya et al. |

* cited by examiner

FIG. 2
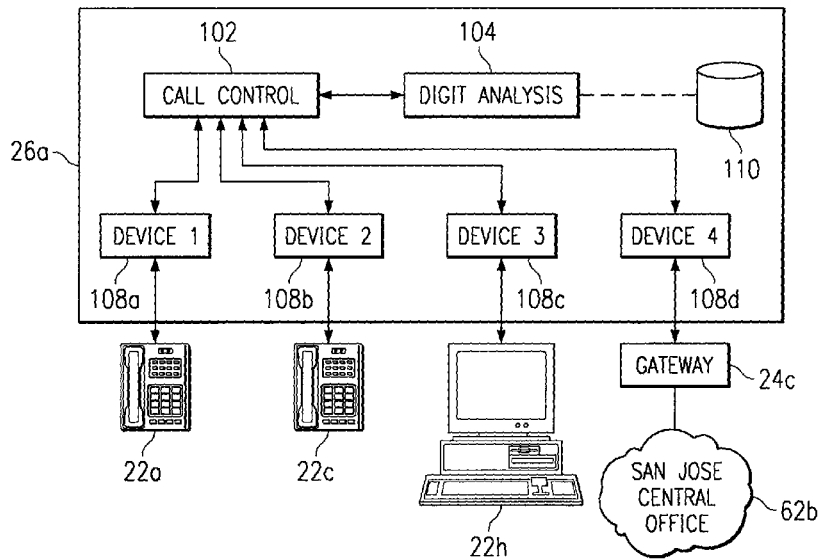
FIG. 3
| DIGIT STRING | PID |
|---|---|
| 1001 | 1.dp.1 |
| 1005 | 1.dp.2 |
| 2008 | 1.dp.3 |
| 9@ | 1.dp.4 |
| XXX-XXXX | 1.dp.4 |
| XXX-XXX-XXXX | 1.dp.4 |
| 1002 | 2.dp.1 |
| 2001 | 2.dp.2 |
| 2002 | 2.dp.3 |
112  114
FIG. 6A
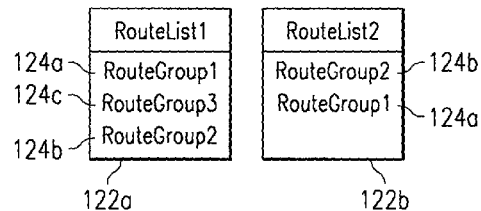
FIG. 6B
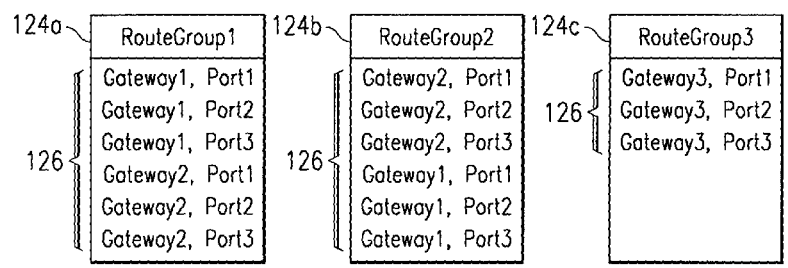

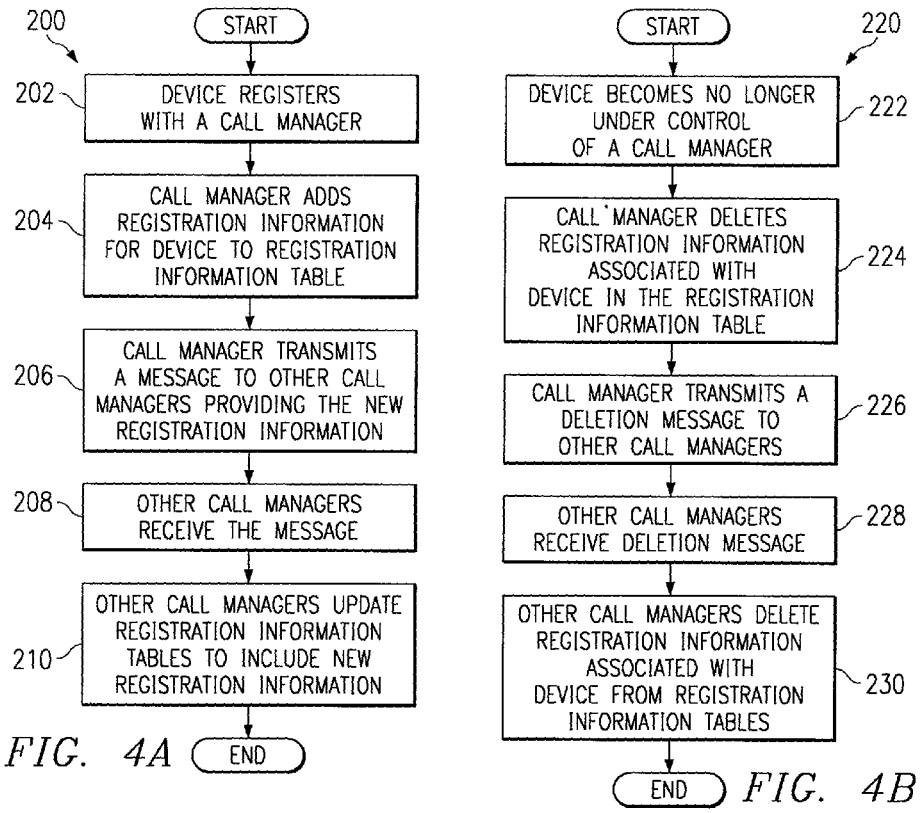
FIG. 4A
FIG. 4B
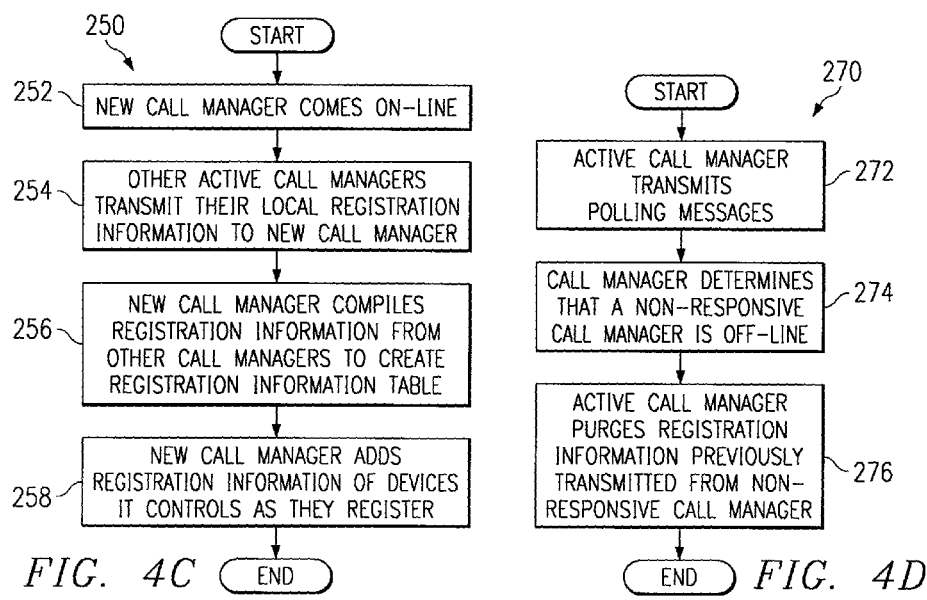
FIG. 4C
FIG. 4D

SYSTEM AND METHOD FOR ROUTING CALLS ACROSS CALL MANAGERS USING A ROUTE PLAN

CROSS-REFERENCE TO RELATED APPLICATIONS

This application is a continuation of U.S. application Ser. No. 09/579,331 filed May 25, 2000 and entitled "System and Method for Routing Calls Across Call Managers Using a Route Plan".

TECHNICAL FIELD OF THE INVENTION

This invention relates generally to the field of telecommunications, and more specifically to a system and method for routing calls across call managers using a route plan.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Packet (VoP). Since many LANs and WANs transmit computer data using packet protocols, such as the Internet Protocol (IP), VoP uses this existing technology to transmit voice and fax signals by converting these signals into digital data and encapsulating the data for transmission over a packet-based network.

SUMMARY OF THE INVENTION

In accordance with the present invention, a system and method for routing calls across call managers using a route plan is provided that substantially eliminates or reduces disadvantages or problems associated with previously developed systems and methods.

In one embodiment of the present invention, a call manager includes a first device process that controls a first telephony device and that receives a call request from the first telephony device. The call request includes a telephone number associated with a second telephony device. The call manager also includes a call control module that receives the call request from the first device process, and the call manager further includes a route list control process that is associated with the telephone number and that receives the call request from the call control module. The route list process accesses a route list to determine a port of a gateway device that can transmit the call request to the second telephony device. The route list process communicates the call request to a second call manager that is coupled to the packet-based network and that controls the gateway device included in the route list.

In another embodiment of the present invention, a method for call routing includes receiving a call request at a first call manager from a first telephony device that is coupled to a packet-based network. The call request includes a telephone number associated with a second telephony device. The method also includes accessing a route list that is associated with the telephone number to determine a port of a gateway device that can transmit the call request to the second telephony device. The method further includes communicating the call request to a second call manager that controls the gateway device included in the route list.

Technical advantages of the present invention include a system and method that enable calls to be routed to gateway devices, which couple external telephony devices to a packet-based network, based on a route plan. The route plan directs that calls be routed to specific gateway devices based on the destination of the call. The present invention allows a call placed from a telephony device controlled by one call manager to be routed using the route plan to a gateway device controlled by a different call manager.

The route plan may be organized into route lists which each contain one or more route groups. The route groups, in turn, include one or more gateway devices. These route lists and route groups may be globally used by all call managers in a particular packet-based network regardless of the relative locations of a call manager and a gateway device in a route group. The route lists and route groups may be dynamically updated to reflect changes in the overall route plan or to reflect a change in the call manager that controls a particular gateway device.

The present invention thus allows a large degree of flexibility in organizing and maintaining a packet-based network having multiple call managers. For example, since gateway devices included in a route group may be controlled by different call managers, if a gateway device loses it connection to a call manager, the gateway device can dynamically and automatically reregister with a different call manager without concern about the effect on the route group. Gateway devices may also be assigned to different call managers to provide load balancing between call managers.

Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which:

FIG. 2 illustrates an exemplary call manager in accordance with one embodiment of the present invention;

FIG. 3 illustrates an exemplary registration information table maintained by a call manager in accordance with one embodiment of the present invention;

FIGS. 4A-4D illustrate exemplary procedures for updating registration information stored in a registration information table in accordance with one embodiment of the present invention;

FIGS. 6A and 6B illustrate exemplary route lists and route groups, respectively, for use in routing calls to gateway devices;

DETAILED DESCRIPTION OF THE INVENTION

Figure 1:
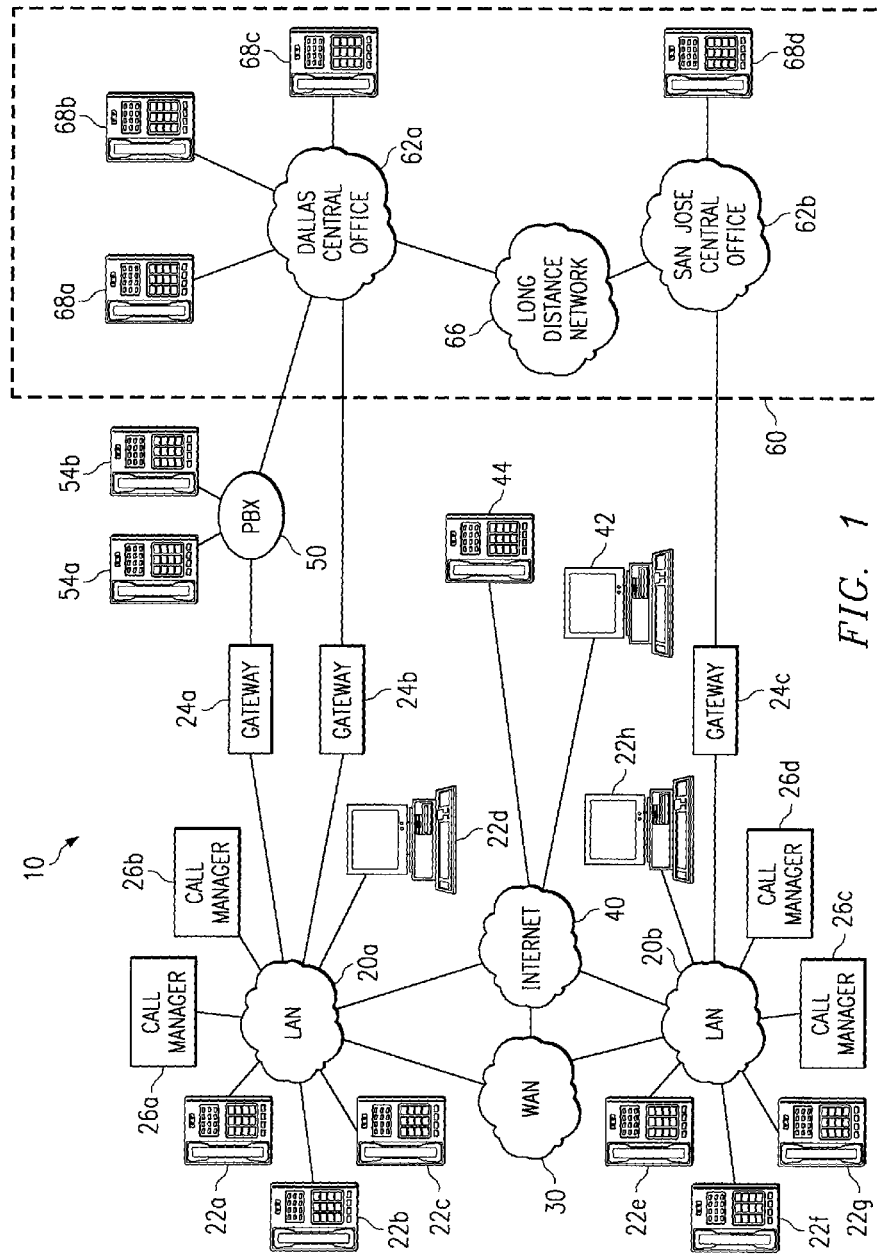
FIG. 1 illustrates an exemplary communication network in accordance with one embodiment of the present invention.

FIG. 1 illustrates an exemplary communication network 10. Although a specific communication network is illustrated in FIG. 1, the term "communication network" should be interpreted as generically defining any network capable of transmitting telecommunication signals, data, and/or messages. In the illustrated embodiment, communication network 10 includes a plurality of local area networks (LANs) 20 interconnected using a wide area network (WAN) 30. Each LAN 20 is a computer data network that is further operable to transmit audio and/or video telecommunication signals. In a particular embodiment, LANs 20 are Internet Protocol (IP) networks. However, LANs 20 may be any type of network that allows the transmission of audio and video telecommunication signals and data, as well as traditional data communications. Therefore, although subsequent description will primarily focus on IP communications, it should be understood that other appropriate method of transmitting telecommunications over a data network, such as a Frame Relay, ATM, or other packet-based network, are also included within the scope of the present invention.

LANs 20 may be directly coupled to other IP networks including, but not limited to, WAN 30 and any IP networks coupled to WAN 30 (such as other LANs 20 or the Internet 40). Since all IP networks share a common method of transmitting data, telecommunication signals may be transmitted between telephony devices located on different, but interconnected, IP networks. In addition to being coupled to other IP networks, LANs 20 may also be coupled to non-IP telecommunication networks through the use of gateway devices 24. For example, LAN 20a is coupled to a private branch exchange (PBX) 50 through a gateway device 24a. PBX 50 includes a plurality of extension telephones or subscriber sets 54a and 54b to which PBX 50 directs incoming telephone calls. Gateway device 24a may be either an analog or a digital gateway device depending on the type of PBX 50 to which it is coupled.

Another non-IP network to which LANs 20 may be coupled is the Public Switched Telephone Network (PSTN) 60. PSTN 60 includes switching stations, central offices, mobile telephone switching offices, pager switching offices, remote terminals, and other related telecommunications equipment that are located across the country. For example, central offices (COs) 62 connect telephone customers, such as residences and businesses, to PSTN 60. In the illustrated embodiment, LANs 20 are coupled to selected central offices 62 through the use of gateway devices 24b and 24c. The operation of the gateway devices 24 in communication network 10 is described in further detail below.

Central offices 62 are coupled through a long distance network 66 that allows communication between residences and businesses coupled to central offices in different areas, such as central office 62a in Dallas and central office 62b in San Jose. The entity that owns the communication lines comprising long distance network 66 (there are typically several different entities, each having their own communication lines) charges a fee for the use of these lines. However, one advantage of IP telephony is that a company owning (or leasing) LANs 20 and WAN 30 may avoid such fees by using WAN 30 to transmit calls between LANs 20 in different areas. Internet 40 may also be used to transmit calls.

IP networks and other packet-based networks transmit data (including voice and video data) by placing the data in packets and sending each packet individually to the selected destination. Unlike a circuit-switched network (like PSTN 60), dedicated bandwidth is not required for the duration of a call or fax transmission over LANs 20, WAN 30 or Internet 40. Instead, each telephony device sends packets across the network as they become available for transmission. This feature makes bandwidth available for other data when voice or fax data is not being transmitted.

The technology that allows telecommunications to be transmitted over an IP network (as well as other packet-based networks) may be referred to as Voice over Packet (VoP). IP telephony devices 22 have the capability of encapsulating a user's voice (or other media inputs) into IP packets so that the voice can be transmitted over LANs 20, WAN 30 and/or Internet 40. IP telephony devices 22 may include telephones, fax machines, computers running telephony software (such as MICROSOFT NETMEETING), gateway devices, H.323-compatible devices, or any other device capable of performing telephony functions in an IP network.

Communication network 10 includes a plurality of call managers 26 that control one or more IP telephony devices 22. A call manager 26 is an application that controls call processing, routing, telephone features and options (such as call hold, call transfer and caller ID), device configuration, and other telephony functions and parameters within communication network 10. A call manager 26 can control one or more of the IP telephony devices 22 coupled to the same LAN 20 to which it is coupled, and a call manager 26 may also control IP telephony devices 22 located elsewhere in communications network 10. For example, call manager 26a is capable of controlling telephony devices on LAN 20b. A call manager 26 may be implemented as software executing on one or more computers coupled to communication network 10. The call manager software may be embodied in any type of computer-readable medium including, but not limited to, hard drives, diskettes, CD-ROMs, DVD-ROMs, or other optical or magnetic storage devices.

When an IP telephony device 22 is connected to a LAN 20 or elsewhere in communication network 10 (or when it otherwise comes on-line), the telephony device 22 may be assigned an IP address using Dynamic Host Control Protocol (DHCP) or another similar protocol or technique. The telephony device 22 then registers with any call manager 26 with which it can communicate using its telephone number and its IP address. Alternatively, the telephony device 22 may request that it be assigned a telephone number and/or an IP address. The term "telephone number" should be understood to include any appropriate combination of digits or characters or any other appropriate method of identifying a telephony device. The telephony device may also report its Media Access Control (MAC) address and/or its device name. The call manager 26 with which a telephony device 22 has registered creates an internal device process, described below, that is used to route signaling to the telephony device 22 from call managers 26 or other telephony devices 22.

The ability of a call manager 26 to control any IP telephony device 22 in communication network 10 allows a call processing environment in which control of devices may distributed dynamically in response to changes in communication network 10. For example, if a call manager 26 goes off-line, the telephony devices 22 controlled by that call manager 26 can connect and register with an alternative call manager 26 in communication network 10. Likewise, if a communication link between a telephony device 22 and a call manager 26 goes down, the telephony device 22 may connect and register with an alternative call manager 26 to which there is an operable communication path. Furthermore, the distributed control of telephony devices 22 also provides for network scalability and load-sharing by allowing telephony devices 22 to be controlled by any call manager 26, regardless of physical location, in order to avoid excess load on a particular call manager 26 when new telephony devices 22 come on-line or to provide load balancing between call managers 26.

FIG. 2 illustrates an exemplary call manager 26a. It should be understood that any appropriate combination of telephony devices 22 and/or gateway devices 24 in communication network 10 may be controlled by call manager 26a. In the illustrated embodiment, call manager 26a controls telephony devices 22a and 22c, which are coupled to LAN 20a, and telephony device 22h and gateway device 24c, which are coupled to LAN 20b.

Call manager 26a includes a number of internal processes that are used to manage and control communication to and from devices 22, 24. These processes include, but are not limited to a call control module 102, a digit analysis module 104, and one or more device processes 108. Call control module 102 is responsible for establishing calls between multiple IP telephony devices 22 or between one or more IP telephony devices 22 and one or more external telephony devices, such as PBX telephony devices 54 and PSTN telephony devices 68.

In the illustrated embodiment, each device 22, 24 has an associated device process 108. Signaling to and from devices 22, 24 is first passed through the associated device process 108, which acts as a signaling contact point in call manager 26a to a device 22, 24. For example, signaling sent from call control module 102 of call manager 26a or signaling sent from another call manager 26 is directed to the appropriate device process 108, which then communicates the signaling to the appropriate device 22, 24. Likewise, signaling sent from a device 22, 24 is first sent to the associated device process 108, and is then communicated to the appropriate destination. Signaling between devices 22, 24 and between call managers may be performed using any appropriate signaling method including, but not limited to, a direct signaling model or a tunneling trunk model, as described below.

When a device 22, 24 coupled to a LAN 20 or any other appropriate location in communication network 10 comes on-line, the device 22, 24 registers with a call manager 26. As described above, a device 22, 24 can register with any call manager 26 with which the device 22, 24 can communicate by sending the call manager 26 a registration request. A call control module 102, or any other appropriate component of call manager 26, receives the registration requests. Call control module 102 (or another appropriate component) generates a device process 108 for the registering device 22, 24 and assigns the device process 108 a process identification number or string (PID).

Call control module 102 communicates the registering device's telephone number and the associated device process PID to digit analysis module 104. Digit analysis module 104 associates the telephone number and the PID in a registration information table 110 or any other appropriate database. Registration information table 110 may also include any other suitable registration information associated with the registering device 22, 24, such as the device name, IP address or MAC address of the device 22, 24.

When a device 22, 24 wishes to establish communications with another device in communication network 10, the device 22, 24 typically communicates one or more digits to the call manager 26 controlling device 22, 24. The digits identify the device with which communication is requested. For example, a telephony device 22 may send a call manager 26 one or more digits indicating the telephone number of an IP telephony device 22 or a non-IP telephony device (such as a PBX device 54 or a PSTN device 68) to initiate a telephone call with the device. Alternatively, a gateway device 24 may communicate one or more digits to a call manager 26 identifying an IP telephony device 22 with which a non-IP telephony device 54, 68 desires to communicate.

Digit inputs received by a call manager 26 are communicated to digit analysis module 104. Digit analysis module 104 may receive these digits directly from a device process 108, a call control module 102 (which received the digits from a device process 108) or any other suitable process in the same or a different call manager 26. Digit analysis module 104 translates the digit input it receives into the PID of the device process 108 that is associated with the device 22, 24 designated by the received digits. Digit analysis module 104 performs this translation using a table look-up in registration information table 110 or any other suitable process of determining the PID associated with the digits. The digits may be an internal telephone number (such a four-digit extension number), in which case the PID typically identifies a device process 108 associated with a telephony device 22. Alternatively, these digits may be an external telephone number (for example, a seven or ten digit North American Numbering Plan number or a PBX extension), in which case the PID may identify a device process 108 associated with a gateway device 24 or a process associated with a plurality of gateway devices 24. Digit analysis module 104 communicates the PID to the process that requested the digit analysis.

As an example, and not by way of limitation, assume that telephony device 22a communicates a call request including a digit string to device process 108a. The digit string is a telephone number of telephony device 22h. Device process 108a receives the digit string and communicates the digits to call control module 102. Call control module 102 communicates the digits to digit analysis module 104 to determine the PID of the device process 108 associated with the digits. Digit analysis module 104 performs a table look-up or any other suitable process of determining the PID associated with the digits (the PID of device process 108c) and communicates the PID to call control module 102. Call control module 102 may then communicate with device process 108c to initiate a call or other communication between telephony devices 22a and 22h, as is described below in further detail.

In the example above, the requested communication was between two telephony devices 22a and 22h controlled by call manager 26a. However, in many cases, devices 22, 24 controlled by different call managers 26 may wish to communicate. For example, due to the distributed nature of call managers 26 and the devices 22, 24 that they control, it is quite possible that two devices 22,24 operated by a business may be controlled by two different call managers 26 located across the country from one another. Therefore, the registration information table 110 in a call manager 26 should have not only the PIDs (or other appropriate registration information) of the device processes 108 associated with the devices 22, 24 that the call manager 26 controls (local devices), but also the PIDs of device processes 108 associated with devices 22, 24 controlled by other call managers 26 (remote devices) with which communication might be desired.

As devices 22, 24 come on-line, go off-line or switch call managers 26, the registration table 110 in each call manager 26 needs to be updated. For this reason, each call manager 26 periodically communicates the telephone numbers and associated PIDs of the devices 22, 24 it controls to each of the other call managers 26. Each call manager 26 adds this information to the local device registration information in its registration information table 110.

FIG. 3 illustrates an exemplary registration information table 110 maintained by call manager 26a. Table 110 contains a list of digit strings 112 in a left column and a list of respective PIDs 114 of device processes 108 in a right column. In the illustrated embodiment, digit strings 112 include both internal four-digit telephone numbers and external telephone numbers (for example, telephone numbers associated with telephony devices 54, 68). The external telephone numbers are designated in table 110 by the notation "9@" (indicating the number nine preceding any digit string). These external telephone numbers could also include any other appropriate format (for example, external calls could be designated as "xxx-xxxx", "xxx-xxx-xxxx" or any other appropriate telephone number pattern which includes wildcards). For the purposes of this description, the term "telephone number" will be used to refer to specific telephone numbers (which include no wildcards) as well as telephone number patterns in which one or more digits are represented by a wildcard, such as "x".

In the illustrated embodiment, each PID 114 includes a node number (representing a call manager 26), a process name (identifying the type of process), and an instance number. For example, the PID '1.dp.3' may indicate the third device process 108 executed by the call manager 26 having a node number of '1'. Similarly, the PID '2.dp.1' indicates the first device process 108 executed by a second call manager having 26 a node number of '2'. Although a particular type of PID 114 is illustrated, any other method of identifying a device process 108 in a call manager 26 may be used. In addition, other appropriate processes associated with devices 22, 24 may also be identified in registration information table 110.

A PID 114 enables a call control module 102 (or another appropriate process) in one call manager 26 to directly communicate with a device process 108 in the same (local) call manager 26 or another (remote) call manager 26 in order to establish communication between two devices 22, 24. Registration information table 110 may contain the PIDs of many different types of processes executing at multiple call managers. This PID information provides a location or address at which a process may be signaled, even if that process is at a different call manager than the process or other component that is sending the signal. As will be described below, using registration information table 110, a telephone number received from a device 22, 24 may be resolved at the call manager 26 receiving the telephone number into a PID of a device process 108 (or other type of process) associated with a device 22, 24 identified by the telephone number. The device process 108 may then be directly signaled even though it may be executing at another call manager.

However, if direct signaling to a remote device process 108 is not available, PIDs 114 of remote device processes 108 may be replaced with just the node number of the remote call manager 26 executing the remote device process 108. In this case, call control module 102 (or another appropriate process) signals the remote call manager 26 with the telephone number of the device 22, 24 with which communication is desired. The call manager receiving the signaling then communicates the telephone number to its local digit analysis module 104, which determines the appropriate local PID. The local digit analysis module 104 communicates the PID to the local call control module 102, which then initiates (or attempts to initiate) the desired communication between devices 22, 24.

To keep the registration information table 110 at each call manager 26 updated, each call manager 26 may dynamically disseminate appropriate registration information associated with devices 22, 24 over which it has control. In addition, call managers 26 may monitor the status of other call managers 26 to determine whether to update or disseminate device registration information. In one embodiment, call managers 26 perform this dissemination and updating of registration information according to a set of four procedures, illustrated in FIGS. 4A-4D. These procedures provide for the updating of the information in the registration information table 110 of each call manager 26 each time a device 22, 24 or call manager 26 comes on-line or goes off-line.

FIG. 4A illustrates a first procedure 200 for updating registration information. Procedure 200 begins when device 22, 24 registers with and comes under the control of a call manager 26 at step 202. This includes a receipt of registration information from the device 22, 24 and the creation of a device process 108 associated with the registering device 22, 24. The controlling call manager 26 adds the appropriate registration information (for example, the device's telephone number and the PID of the associated device process 108) to its registration information table 110 at step 204 and communicates a message to all other active call managers 26 providing the registration information at step 206. The other call managers 26 receive this message at step 208, and each call manager 26 updates its registration information table 110 to include the new registration information at step 210. This dissemination of information according to procedure 200, as well as the three other procedures described below, may be made directly between digit analysis modules 104 of the active call managers 26.

FIG. 4B illustrates a second procedure 220 for updating registration information. Procedure 220 begins at step 222 when a device 22, 24 fails, is disconnected from communication network 10, unregisters with its controlling call manager 26, or is otherwise no longer under the control of a previously controlling call manager 26. The call manager 26 deletes the registration information associated with the device 22, 24 from its registration information table 110 at step 224 and communicates a deletion message to all other active call managers 26 indicating that the information has been deleted at step 226. The other call managers 26 receive this message at step 228 and delete the registration information associated with the device 22, 24 from their registration information table 110 at step 230. The deletion message sent when a device 22, 24 is no longer controlled by a particular call manager 26 and the registration information sent when a device registers (becomes under control) of a particular call manager 26 may both be generalized as types of status information sent by a call manager 26 when the call manager 26 becomes aware of a change in the control status of a device 22, 24.

A controlling call manager 26 may periodically poll the devices 22, 24 that it controls by sending out a polling message to determine when a device 22, 24 has failed, been disconnected from communication network 10, or is otherwise no longer able to be controlled by the call manager 26. If call manager 26 fails to receive a response to a polling message from a device 22, 24, call manager 26 determines that the non-responding device 22, 24 is no longer under its control. Alternatively, call manager 26 may expect a regular "heartbeat" from each device 22, 24 registers with call manager 26. If a registered device 22, 24 does not send a heartbeat, call manager 26 determines that the device 22, 24 is no longer under its control.

FIG. 4C illustrates a third procedure 250 for replicating registration information. Procedure 250 begins when a new call manager 26 is connected to communication network 10 and comes on-line at step 252. When the new call manager 26 is detected, the other active call managers 26 communicate their local registration information (the information associated with the devices 22, 24 that a call manager 26 controls) to the new call manager 26 at step 254. Call managers 26 may detect the presence of a new call manager 26 in communication network 10 by periodically communicating polling messages over communication network 10 and determining whether a new call manager 26 has responded. The new call manager 26 compiles the registration information sent by the other call managers 26 to create its own registration information table 110 at step 256. As devices 22, 24 register with the new call manager 26, the new call manager 26 adds local registration information to the remote registration information received from the other call managers 26 at step 258.

The combination of the local and remote registration information may be referred to as composite registration information. This composite registration is stored in registration information table 110. The registration information table 110 of a call manager 26 may include one or more flags indicating which entries in that particular registration information table 110 comprise local registration information, so that the call manager 26 storing the registration information table 110 will know which entries to replicate to new call managers 26. Alternatively, a call manager 26 may determine which entries comprise local registration information based on the node number or PID included in the entry.

FIG. 4D illustrates a fourth procedure 270 for replicating registration information when a call manager 26 has gone off-line (for example, when it has failed, is disconnected from communication network 10, or is unable to communicate with one or more of the other active call managers 26). Procedure 270 begins with each active call manager 26 communicating polling messages to each of the other active call managers 26 at step 272. A call manager 26 determines that a previously active call manager 26 (for example, a call manager 26 that previously responded to polling messages) has gone off-line at step 274 when the previously active call manager 26 fails to respond to the polling message. The active call manager 26 purges the registration information stored in its registration information table 110 that was previously communicated by the non-responsive call manager 26 (the non-responsive call manager's local registration information) at step 276. A similar process is performed by all other active call managers 26.

Although slow data transmission rates or other communication problems affecting the replication and updating procedures described above may cause inconsistencies between the registration information tables 110 of the active call managers 26, these inconsistencies are resolved over time without having a detrimental effect on the operation of call managers 26 and their control of devices 22, 24. As an example, assume that telephony device 22a, which is controlled by call manager 26a and has a telephone number or extension of '1000', is unable to communicate with call manager 26a due to a network failure. When call manager 26a fails to receive a polling response from telephony device 22a, call manager 26a deletes the registration information associated with telephony device 22a from its registration information table 110. Call manager 26a communicates a message to all active call managers 26 indicating that the information has been deleted according to procedure 220.

However, due to slow data transmission rates in portions of communication network 10, telephony device 22a is able to reregister with a call manager 26c as extension '1000' before the deletion message from call manager 26a reaches call manager 26c. Call manager 26c registers telephony device 22a and changes the PID that was associated with extension '1000' in its registration information table 110 from a remote PID (located at call manager 26a) to a local PID of a device process 108 that was created for telephony device 22. Call manager 26c communicates a message to all active call managers 26 providing the registration information according to procedure 200. When call manager 26c receives the deletion message from call manager 26a, call manager 26c ignores the deletion message since it no longer associates extension '1000' with a device process 108 at call manager 26a.

Alternatively, call manager 26c may not initially change the PID associated with extension '1000' when telephony device 22a registers with call manager 26c. Instead, call manager 26c may create a second entry associated with extension '1000'. The multiple entries are then resolved as described below in relation to call manager 26b.

In this example, a third call manager 26b is also active in communication network 10. Call manager 26b receives the registration message from call manager 26c before it receives the deletion message from call manager 26a. Call manager 26b adds the new registration information for extension '1000' in its registration information table accordingly. However, it does not remove the entry for extension '1000' associated with call manager 26a, since it has received conflicting information regarding the PID to be associated with extension '1000'. Typically, call manager 26b will eventually receive the deletion message from call manager 26a, and call manager 26b will then delete the extension '1000' entry associated with call manager 26a. However, if this deletion message is not received due to some type of network failure, the next time call manager 26b attempts to signal the device process 108 of call manager 26a associated with extension '1000', call manager 26a will inform call manager 26b that it no longer controls telephony device 22a. Call manager 26b then deletes the extension '1000' entry associated with call manager 26a in its registration information table 110. Therefore, the registration information tables 110 of call managers 26 eventually become consistent, and there is no disruption in performance during the interim.

Due in part to the digit analysis replication scheme described above, a dynamic, flexible, scalable and reliable IP telephony network is created in which the task of controlling a number of devices 22, 24 can be distributed seamlessly and dynamically between a number of call managers 26. A call manager 26 can control any device 22, 24 coupled to communication network 10 regardless of the respective geographic locations of the call manager 26 and the devices 22, 24. Therefore, in the event that a call manager 26 experiences communication problems, goes off-line, or reaches its device control capacity, the control of devices 22, 24 can be automatically distributed to other call managers 26, regardless of their physical location. Furthermore, the distribution of device control between call managers 26 can be dynamically changed without the intervention of a human administrator.

Figure 5:
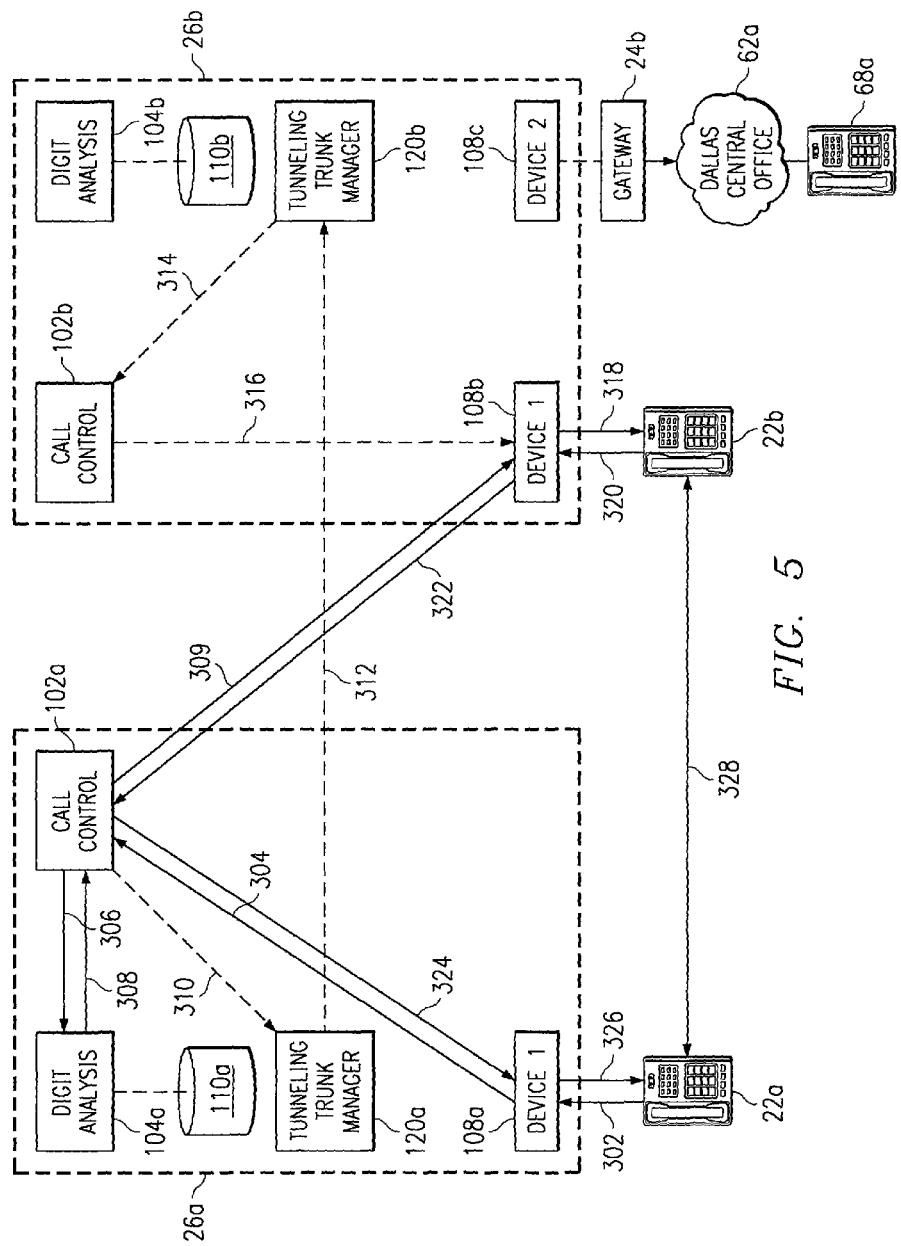
FIG. 5 illustrates an exemplary call routing process between call managers coupled to the communication network.

FIG. 5 illustrates an exemplary call routing process between call managers 26a and 26b in communication network 10. Although FIG. 5 illustrates call managers 26a and 26b and certain devices 22, 24 controlled by call managers 26a and 26b, it should be understood that this description applies to call routing between any devices 22, 24 controlled by any call manager(s) 26 in communication network 10. Furthermore, although FIG. 5 illustrates a series of communications between different modules or processes in call managers 26a and 26b, other appropriate intermediary modules or processes may be involved in these communications, and the functions of one or more of the described modules or processes may be divided between multiple components or combined in a single component.

When a user wishes to place a call from IP telephony device 22a to IP telephony device 22b in communications network 10, the calling telephony device 22a communicates a call request signal to its associated device process 108a executed by call manager 26a, as indicated by arrow 302. The call request signal indicates the telephone number of called telephony device 22b. Device process 108a communicates the call request to call control module 102a as indicated by arrow 304, and call control module 102a communicates the telephone number of called telephony device 22b to digit analysis module 104a as indicated by arrow 306. Call control module 102a may communicate the telephone number as a whole or it may communicate each digit of the telephone number successively. Digit analysis module 104a obtains device location information from registration information table 110a, and communicates this location information to call control module 102a, as indicated by arrow 308.

The type of location information that digit analysis module 104a communicates to call control module 102a depends on the signaling method used to communicate with device processes 108. As discussed above, if direct signaling between call control module 102a and device process 108b is used, then registration information table 110a includes a PID for device process 108b. In this case, digit analysis module 104a determines the PID associated with the telephone number in registration information table 110a (the PID of device process 108b) and communicates the PID to call control module 102a. Call control module 102a directly signals device process 108b with the call request, as indicated by arrow 309.

Alternatively, call control process 102a may communicate with call control process 102b using a tunneling trunk instead of communicating directly to device process 108b. This tunneling trunk may be, but is not limited to, a Transmission Control Protocol (TCP) or a User Datagram Protocol (UDP) connection between call manager 26a and call manager 26b. If a tunneling trunk is used, registration information table 110a associates the node number of call manager 26b (which may be included in a PID of device process 108b) with the telephone number of telephony device 22b. Digit analysis module 104a communicates the node number or complete PID to call control module 102a. As indicated by arrow 310, call control module 102a communicates the call request (including the node number or PID) to a tunneling trunk manager 120a that controls communication over the tunneling trunks connecting call manager 26a to the other call managers 26. Arrow 310 is dashed to indicate that the use of tunneling trunks is an alternative to direct signaling.

If the node number or PID indicates that the called device is controlled by call manager 26a (which is not the case in the illustrated embodiment), tunneling trunk manager 120 would return the call request to call control module 102a. Call control module 102a would signal the device process 108 associated with called telephony device 22b to indicate the call request from calling telephony device 22a.

If, as illustrated, the node number or PID indicates that called device 22b is remote from call manager 26a and controlled by call manager 26b, tunneling trunk manager 120a communicates the call request to a tunneling trunk manager 120b using a tunneling trunk set up between call managers 26a and 26b, as indicated by arrow 312. Tunneling trunk manager 120b communicates the call request to call control module 102b, as indicated by arrow 314. If a PID was communicated from call manager 26a (and thus the telephone number was resolved into the address of a device process 108 at call manager 26a), the PID is communicated to call control module 102b and the telephone number of telephony device 22b need not be sent from call manager 26a. Alternatively, if only a node number was communicated from call manager 26a, then call control module 102a may instruct tunneling trunk manager 120a to also send the telephone number of telephony device 22b to identify the telephony device 22 being called.

When call control module 102b receives the call request, call control module 102b either directly communicates with device process 108b based on a PID sent from call control module 102a, or call control module 102b communicates a telephone number sent by call manager 26a to digit analysis module 104b, which then returns the PID of device process 108b. Call control module 102b signals device process 108b to indicate the call request from calling telephony device 22a, as indicated by arrow 316.

Having received a call request signal from either call control module 102a or 102b (or from any other appropriate source) using either direct signaling or a tunneling trunk (or any other appropriate signaling method), device process 108b communicates the call request to called telephony device 22b, as indicated by arrow 318. If called telephony device 22b is available to communicate with calling telephony device 22a, called telephony device 22b communicates a call proceed signal to device process 108b, as indicated by arrow 320. The call proceed signal may be any appropriate communication that indicates a device's availability or desire to proceed with a communication. Device process 108b then communicates the call proceed signal to call control module 102a. Device process 108b may communicate this signal directly to call control module 102a using a direct signaling link, as indicated by arrow 322, or device process 108b may first communicate the signal to call control module 102b, which then communicates the signal to call control module 102a using the tunneling trunk, as described above.

Call control module 102a sets up the call by communicating the call proceed signal to device process 108a, as indicated by arrow 324. Device process 108a signals calling telephony device 22a, as indicated by arrow 326, and instructs telephony device 22a to establish media (audio and/or video) streaming with called telephony device 22b over a UDP connection, or any other suitable connection for transmitting media. A media streaming connection 328 may be directly between telephony devices 22a and 22b.

When media streaming connection 328 is established, the users of telephony devices 22a and 22b may begin to communicate. A codec (coder/decoder) in telephony devices 22a and 22b converts the media (for example, voice, video or fax) signals generated by the users of telephony devices 22a and 22b from analog signals into digitally encoded data. The codec may be implemented either in software or as special-purpose hardware in IP telephony devices 22a and 22b.

The digitally encoded data is encapsulated into IP packets so that it can be transmitted between telephony devices 22a and 22b. The encapsulation may be performed using Real-Time Transport Protocol (RTP) running over UDP, or any other suitable communication protocol. Once UDP has received and reassembled the IP packets at the destination telephony device 22, a codec in the destination telephony device 22 translates the digital data into analog audio and/or video signals for presentation to the user. The entire process is repeated each time that any call participant (or any other source) generates a media signal.

In addition to calls between IP telephony devices 22, calls can also be placed to and received from non-IP telephony devices 54, 68 that are connected to PBX 50, PSTN 60, or any other appropriate external network. Gateways 24 couple telephony devices 54, 68 to LANs 20 and convert analog or digital circuit-switched data transmitted from PBX 50 or PSTN 60 to packetized data transmitted by LANs 20, and vice-versa.

When a user of an IP telephony device 22a desires to place a call to an external telephony device, such as a PBX telephony device 54 or a PSTN telephony device 68, from IP telephony device 22a, calling telephony device 22a communicates a call request signal to its associated device process 108a. The call request signal indicates the telephone number of the called telephony device, for example PSTN telephony device 68a. As described above, device process 108a communicates the call request to call control module 102a, and call control module 102a communicates the telephone number of telephony device 68a to digit analysis module 104a.

Digit analysis module 104a communicates location information associated with the telephone number in registration information table 110a to call control module 102a. Since telephony device 68a is not an IP telephony device 22 controlled by a call manager 26, its telephone number (including a telephone number representing its telephone number, such as 'xxx-xxx-xxxx') may be associated in registration information table 110a with a process controlling one or more gateway devices 24 that provide access to PSTN 60. For example, the telephone number '214-xxx-xxxx' (214 being an area code in Dallas) may be associated with the PID or node number of a device process 108c controlling gateway 24b. Gateway 24b provides access to Dallas central office 62a (to which telephony device 68a is coupled). Alternatively, the telephone number may be associated with a route list control process that controls multiple gateway devices 24 by acting as an intermediary between a call control module 102 and the device processes 108 controlling each gateway device 24.

Assuming the telephone number or extension indicated in the call request from telephony device 22a is directly associated with device process 108c controlling gateway 24b (for example, there is no intermediate route list control process), the PID (or associated node number) of device process 108c is communicated from digit analysis module 104a to call control module 102a. Call control module 102a signals device process 108c using direct signaling, a tunneling trunk, or any other appropriate signaling method to indicate the call request and the telephone number of telephony device 68a. Process 108c communicates with gateway 24b, and gateway 24b interfaces with central office 62a to determine whether telephony device 68a can accept the call. If telephony device 68a can accept the call, gateway 24b communicates a call proceed signal (through device process 108c) to device process 108a using direct signaling, a tunneling trunk, or any other appropriate signaling method. Telephony device 22a establishes a media streaming connection with gateway device 24b using UDP/IP or any other appropriate method.

As described above, a codec in telephony device 22a converts the media signals generated by the user of telephony device 22a from analog signals into digital encoded data. The digitally encoded data is encapsulated into IP packets. The IP packets are communicated to gateway device 24b and gateway device 24b converts the digital data to the analog or digital format used by the PSTN trunk to which gateway device 24b is coupled. Gateway device 24b signals central office 62a to direct the media from telephony device 22a to telephony device 68a. For media transmissions from PSTN telephony device 68a to IP telephony device 22a, the process is reversed. Gateway device 24b receives the incoming media transmissions (in either analog or digital form) and converts them into the digital format used for communications over LAN 20a. The digital data is then encapsulated into IP packets and transmitted over LAN 20a to IP telephony device 22a.

A similar process to that described above is used when a call is placed from PSTN telephony device 68a (or any other non-IP telephony device) to IP telephony device 22a. In this case, a user of telephony device 68a dials a telephone number that is associated in central office 62a with gateway device 24b. For example, the telephone number '214-555-xxxx' may be associated with gateway 24b (where 'xxxx' represents the extensions of one or more IP telephony devices 22). If telephony device 68a dials '214-555-1001', then central office 62a connects telephony device 68a with gateway 24b. Gateway 24b communicates the call request (including the telephone number dialed by the user of telephony device 68a, which gateway device 24b may or may not truncate to leave only the last four digits) to its device process 108c.

Device process 108c communicates the call request to call control module 102b, and call control module 102b communicates the telephone number to digit analysis module 104b. Digit analysis module 104b communicates location information for device process 108a that is associated with the telephone number to call control module 102b. Call control module 102b communicates the call request to device process 108a (through direct signaling, a tunneling trunk, or any other appropriate method), and device process 108a communicates the call request to telephony device 22a. If telephony device 22a accepts the call by sending a call proceed signal, media streaming is set up between telephony device 22a and gateway device 24b, and the call proceeds as described above (with gateway device 24b acting as an intermediary between telephony devices 22a and 68a).

FIGS. 6A and 6B illustrate exemplary route lists 122 and route groups 124, respectively, for use in routing calls to gateway devices 24. As mentioned above, instead of being directly associated with a device process 108 controlling a gateway device 24, a telephone number may be associated in registration information table 110 with a route list control process providing access to one or more gateway devices 24. Each route list control process has an associated route list 122 that contains an ordered list of one or more route groups 124. For example, route list 122a includes route groups 124a, 124c, and 124b, in the order listed. A route group 124 includes an ordered list of one or more device name/port number pairs 126 associated with one or more gateway devices 24. For example, route group 124a includes Port1, Port2 and Port3 of Gateway1, and Port1, Port2 and Port3 of Gateway2. The ports of a gateway device 24 are the individually addressable physical, logical or virtual resources, such as trunk lines or logical channels, over which a call may be placed to a non-IP telephony device 54, 68. An individual port may be capable of handling multiple calls.

As will be described in further detail below, when a telephone number is dialed that is associated with a route list control process in registration information table 110, the call request is sent to the route list control process. The route list control process offers the call to the ports of the gateway devices 24 listed in the first route group 124 of the route list 122 associated with the route list control process, for example, route group 124a of route list 122a. The call is offered to these ports in the order in which the associated port numbers are listed in the route group 124a. The route list control process communicates the call request to each gateway device 24 (indicating the requested port) until one of the gateway devices 24 accepts the call. If no port listed in route group 124a can accept the call, the route list control process begins offering the call to the ports listed in route group 124c, and then to the ports listed in route group 124b.

The route lists 122 and accompanying route groups 124 described above are included in a route plan that optimally associates a route list with every type of external number that may be dialed by a user of an IP telephony device 22. For example, the telephone number "214-xxx-xxxx" (a Dallas area code) may be associated with a route list 122 that includes one or more port numbers of gateway 24b in the first route group 124. Therefore, no matter where the calling telephony device 22 is located in communication network 10, the call will first be offered to gateway 24b (which can place the call directly to Dallas central office 62a as a local call without incurring long distance fees). Furthermore, many other factors besides long distance fee savings may also be considered when creating the route plan. Since a route list 122 may apply to many telephony devices 22 (based on the type of external calls made by telephony devices 22), and since those telephony devices 22 may be controlled by multiple call managers 26 in various locations, the route plan is a global plan that is shared between call managers 26.

Figure 7:
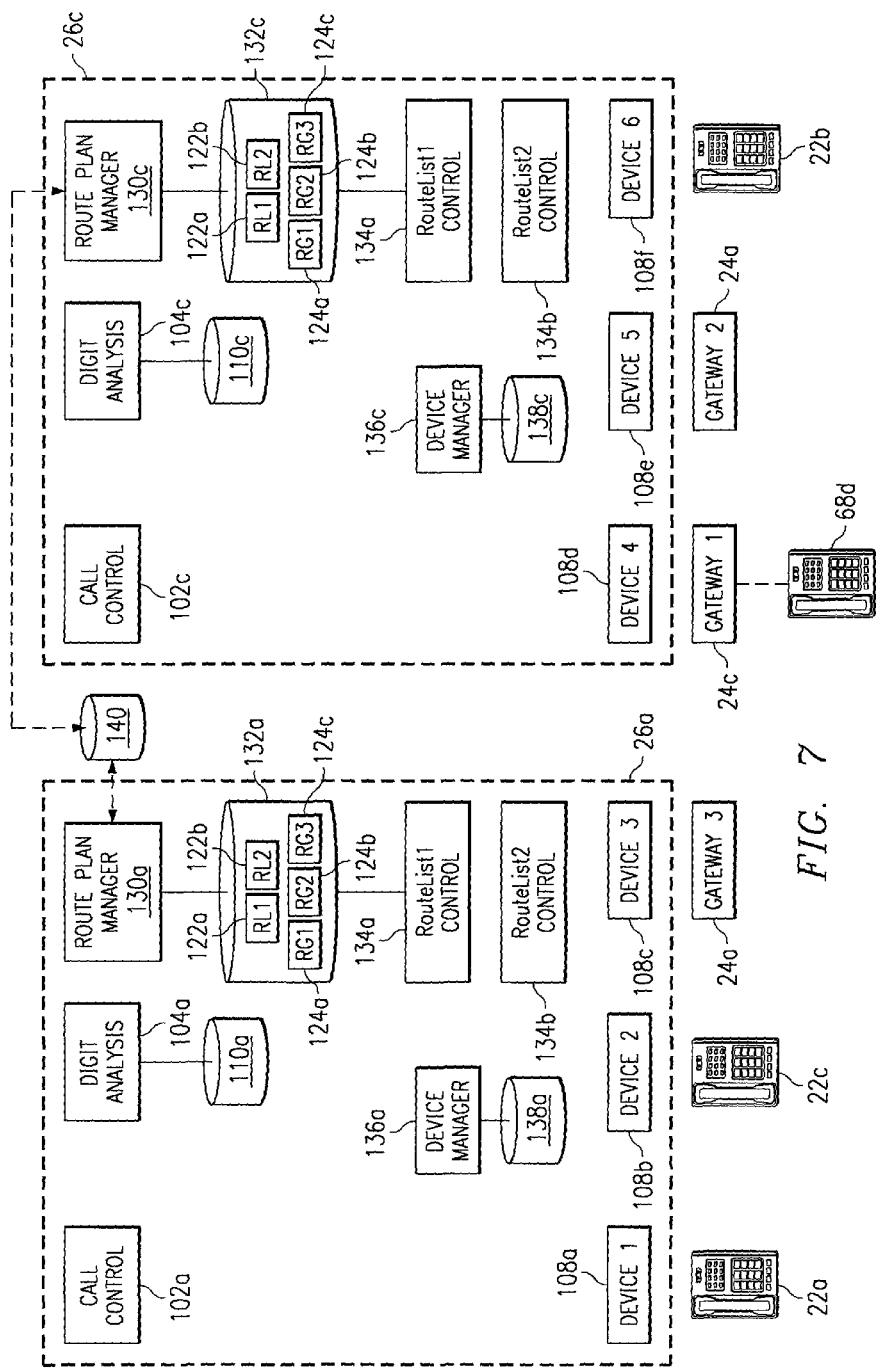
FIG. 7 illustrates exemplary call managers which are operable to route calls according to a global route plan.

FIG. 7 illustrates exemplary call managers 26a and 26c which are operable to route calls according to a global route plan. Call managers 26 each include a route plan manager 130. Each route plan manager 130 is responsible for downloading and locally storing the global route plan, and for updating the locally stored route plan when there has been a change to the global route plan. The global route plan, including route lists 122 and route groups 124, may be stored in a global route plan database 140 that is accessible from each call manager 26. Each route plan manager 130 downloads the route plan from global route plan database 140 and stores the route plan in a local route plan database 132. Local route plan database 132 may be managed by route plan manager 130 or any other appropriate component of call managers 26. In an alternative embodiment, route plan manager 130 does not download the global route plan database in its entirety. In this embodiment, route plan manager 130 accesses global route plan database 140 as needed to route calls instead of accessing information stored in a local route plan database 132.

Returning to the former embodiment, after downloading the route plan to local route plan database 132, the route plan manager 130 at each call manager 26 determines the route lists 122 included in the global route plan and creates a route list control process 134 for each route list 122. Therefore, each call manager 26 includes the same route list control processes 134. If an exemplary route plan that includes route lists 122a and 122b, and route groups 124a, 124b, and 124c is assumed, then each route plan manager 130 creates route list control processes 134a and 134b associated with route lists 122a and 122b, respectively. If a route list 122 is later added to or deleted from the route plan, then each route plan manager 130 creates a new route list control process 134 or deletes an existing route list control process 134, as appropriate. The method by which route plan managers 130 propagate and receive changes to the route plan is described below.

Each route list control process 134 is an intermediary between call control module 102 and the device process 108 controlling gateway devices 24 included in the associated route list 122. When a route list control process 134 is created, route plan manager 130 instructs the route list control process 134 to register with call control module 102. Route list control process 134 communicates a signal to call control process 102 indicating its PID and the telephone numbers to be associated with route list control process 134 in registration information table 110 according to the route plan. Call control module 102 communicates this information to digit analysis module 104 for inclusion in registration information table 110. Therefore, in addition to or instead of device process PIDs 114 (illustrated in FIG. 3), registration information table 110 includes route list control process PIDs associated with telephone numbers.

When a call is placed from a telephony device 22, 54, 68, the telephone number associated with the call request is sent to the appropriate digit analysis module 104, as described above. If the called telephony device is a non-IP telephony device 54, 68, the telephone number is typically associated in the route plan with a particular route list 122. Therefore, the telephone number will be associated with a PID of a route list control process 134 in the registration information table 110 of digit analysis module 104. The call request is communicated to the route list control process 134 indicated by the PID. Route list control process 134 accesses its associated route list 122 and route groups 124 in database 132 and determines an ordered list of gateway device names and associated port numbers through which the call may be placed.

As described above, route groups 124 included in the route plan may include any gateway device 24 coupled to communication network 10. Gateway devices 24 may be controlled by different call managers 26, and the call manager 26 controlling a particular gateway device 24 may change over time. Route groups 124 identify a gateway device 24 using the device name of the gateway device 24 in order to avoid having to change the entries associated with the gateway device 24 each time the gateway device 24 comes under the control of a new call manager 26. The device name does not change when the gateway device 24 registers with a new call manager 26. However, to communicate a call request directly to a gateway device 24, route list control process 134 uses the PID of (or other location information associated with) the device process 108 controlling the gateway device 24. Therefore, a device manager 136 executed by each call manager 26 maintains a device name mapping table 138 that associates the device name of each gateway device 24 with the PID of (or other location information associated with) the device process 108 controlling the gateway device 24.

When a gateway device 24 registers with a call manager 26, the device process 108 created to control the gateway device 24 sends a registration signal to device manager 136 indicating the PID of the device process 108 and the device name of the gateway device 24. Device manager 136 receives similar registration signals from other registering gateway devices 24, and device manager 136 maintains a device name mapping table that associates the device name of each gateway device 24 with a PID of the device process 108 controlling each gateway device 24.

When a route list control process 134 selects a device name from an associated route group 124, route list control process 134 communicates the device name to device manager 136. Device manager 136 determines the PID associated with the device name in device name mapping table 138, and communicates the PID to route list control process 134. Route list control process 134 then communicates the call request to the device process 108 indicated by the PID. Alternatively, each route group 124 may include device process PIDs instead of device names. In this alternative embodiment, device manager would not be needed to perform a device name-to-PID look-up, but the PIDs in each route group 124 would need to be updated to reflect changes in the PIDs of the device process 108 controlling a particular gateway device 24.

The device process 108 to which route list control process 134 communicates the call request may be located at a remote call manager 26. Route list control process 134 communicates the call request to device process 108 using direct signaling, a tunneling trunk, or any other appropriate method. If the particular port of the gateway device 24 cannot process the call, route list control process 134 then begins to offer the call to other ports or other gateway devices 24, as indicated by the route list 122 and its associated route groups 124.

To enable the routing of calls between multiple call managers 26 using a route list 122, any changes to the route plan and any changes to a device name mapping table 138 should be replicated between call managers 26. The route plan may be changed by the creation, modification or deletion of a route list 122 or route group 124, or by a modification of the telephone numbers associated with a particular route list 122. As described above, the route plan is stored in global route plan database 140 that is accessible by all call managers 26. When a call manager 26 comes on-line, the route plan manager 130 downloads the current route plan from global route plan database 140 and stores the route plan in local route plan database 132. Thereafter, when a call manager 26 (or any other appropriate device, such as a computer executing route plan management software) creates, modifies or deletes a route list 122 or route group 124, call manager 26 (or the other appropriate device) sends a signal to global route plan database 140 indicating the change to be made. Global route plan database 140 (or a device controlling database 140) updates the route plan data accordingly. Call manager 26 communicates a change notification message to each of the other call managers 26 indicating the name of the route list(s) 122 or route group(s) 124 that has been created, modified or deleted. A change notification message may be communicated directly to the route plan manager 130 of each of the other call managers 26.

If a route plan manager 130 receives a change notification message indicating a modification to a route list 122, route plan manager 130 communicates an unregister signal to the route list control process 134 associated with the route list 122 and deletes the existing route list 122 in local route plan database 132. Route plan manager 130 queries global route plan database 140 for the new route list 122. The new route list 122 is communicated from global route plan database 140 and stored in local route plan database 132. Route plan manager 130 instructs the route control process 134 that was previously instructed to unregister to re-register with call control module 102 (and, if applicable, to inform call control module 102 of any new telephone numbers to be associated in registration information table 110 with route control process 134). A similar process is performed when a route group 124 is changed, however, the route list control processes 134 associated with any route lists 122 containing the route group 124 are not instructed to unregister before the updated route group 124 is downloaded.

A similar process is also performed when a route list 122 or route group 124 is created or deleted. The only difference is that when a route list 122 is created, an associated route list control process 134 should be created at each call manager 26, and when a route list 122 is deleted, the associated route list control process 134 at each call manager 26 should be deleted.

It should be noted that unlike the device registration information associated with telephony devices 22 in registration information table 110 (for example, a telephone number and a device process PID), the registration information associated with route lists in registration information table 110 (for example, a telephone number and a route list control process PID) does not need to be replicated between call managers 26. This is because a route list control process 134 is created for each route list 122 in the route plan at every call manager 26 when the route plan is downloaded or updated by the route plan manager 130 of each call manager 26. Therefore, this information is already replicated in each registration information table 110. A flag may be associated with the route list control process entries in each registration information table 110 to indicate that the entry does not need to be replicated.

In addition to the route plan data, the device name information (device name and associated device process PID) in device name mapping table 138 also should be replicated to all call managers 26 upon the occurrence of certain events. This device name information is updated and replicated between call managers 26 using a process similar to the process described above for updating and replicating device registration information (using procedures 200, 220, 250, 270).

As with procedure 200, when a gateway device 24 registers with a call manager 26, the device name and PID of the device process 108 controlling with the gateway device 24 are communicated to device manager 136 and stored in device name mapping table 138. The call manager 26 with which the gateway device 24 registered then communicates the device name and associated PID to all other call managers 26 coupled to communication network 10.

As with procedure 220, when a gateway device 24 unregisters or is otherwise no longer under the control of a call manager 26, the device manager 136 of the previously controlling call manager 26 deletes the associated device name and PID from its device name mapping table 138 and communicates a deletion message to all other call managers 26 indicating that the device name and associated PID should be deleted from the device name mapping tables 138 of the other call managers 26.

As with procedure 250, when a new call manager 26 comes on-line, all other call managers 26 send the new call manager 26 the device names and associated PIDs for each of the gateway devices 24 that each call manager 26 controls (the local device name information stored at each call manager 26). The new call manager 26 adds the device name information received from the other call managers 26 to its device name mapping table 138, and also adds device name information associated with gateway devices 24 that subsequently register with the new call manager 26. As with process 270, when a call manager 26 goes off-line, all other call managers 26 delete the device name information associated with the gateway devices 24 that were under the control of the off-line call manager.

In the manner described above, the route plan and device name information stored at each call manager 26 is kept updated so that call routing between call managers 26 may be performed according to the route plan. Alternatively, the route plan and device name information may be maintained and updated using any other appropriate method.

Figure 8:
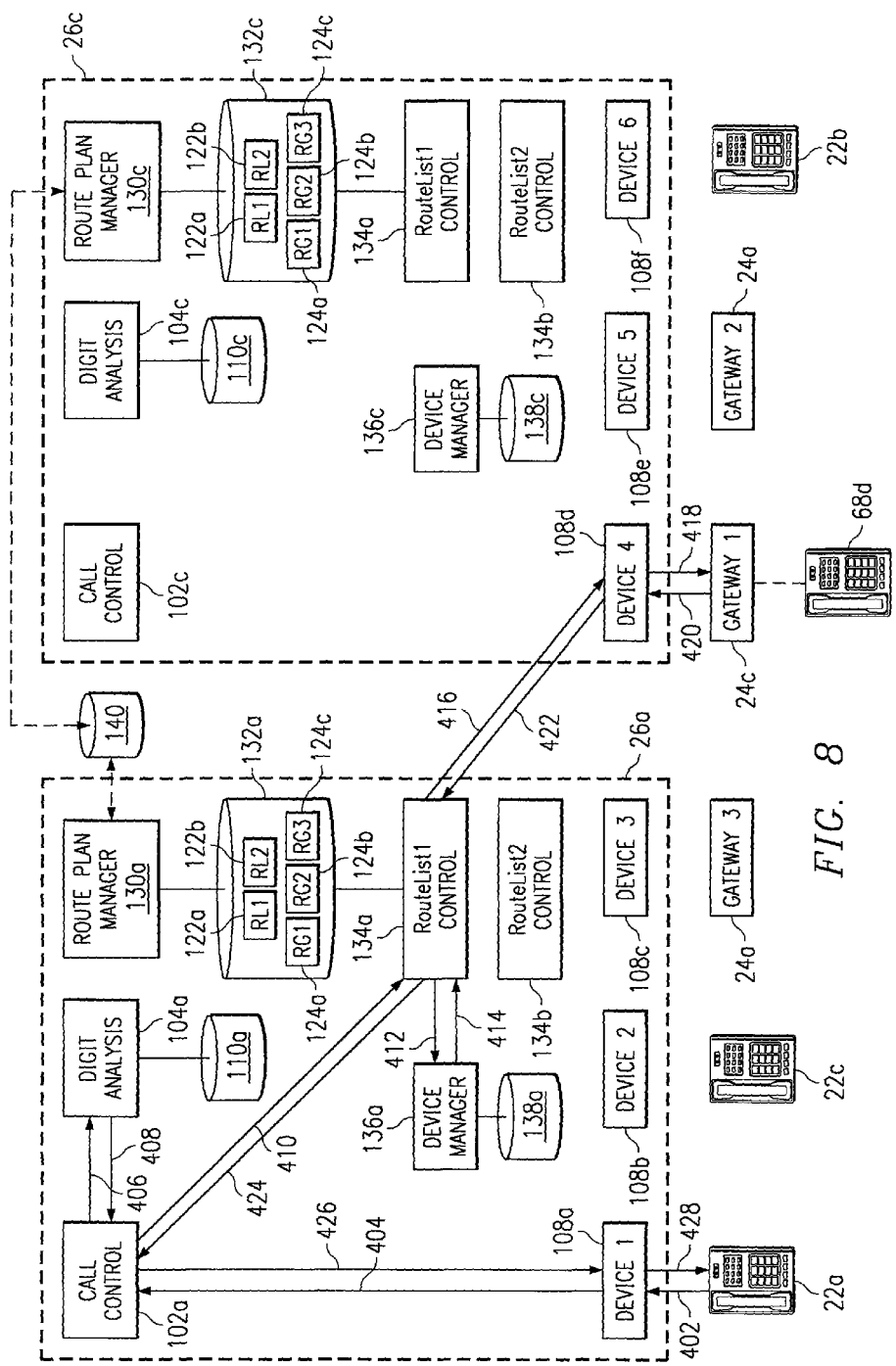
FIG. 8 illustrates an exemplary call routing process between the call managers of FIG. 7.

FIG. 8 illustrates an exemplary call routing process between call managers 26a and 26c using a route plan. In the illustrated embodiment, a user of IP telephony device 22a is attempting to place a call to a user of PSTN telephony device 68d. However, it will be understood that the following description applies equally to calls placed from any telephony device 22, 54, 68 through a gateway 24 to a non-IP telephony device 54, 68. In the illustrated embodiment, telephony device 22a communicates a call request signal (including a telephone number associated with telephony device 68d) to its associated device process 108a as indicated by arrow 402. Device process 108a communicates the call request to call control module 102a, as indicated by arrow 404. Call control module 102a communicates the telephone number included with the call request to digit analysis module 104a, as indicated by arrow 406. Digit analysis module 104a determines a PID associated with the telephone number and communicates this PID to call control module 102a, as indicated by arrow 408.

In the exemplary embodiment, the PID communicated from digit analysis module 104a identifies route list control process 134a associated with route list 122a, illustrated in FIG. 6A. Based on the PID received from digit analysis module 104a, call control module 102a communicates the call request to route list control process 134a, as indicated by arrow 410. Route list control process 134a accesses its associated route list 122*a* in local route plan database 132*a*, and obtains the first device name (and associated port number) listed in the first route group 124*a* of route list 122*a*. Route list control process 134*a* communicates the device name to device manager 136*a* and requests the PID associated with the device name, as indicated by arrow 412. Device manager 136*a* responds by communicating the PID associated with the device name in device name mapping table 138 to route list control process 134*a*, as indicated by arrow 414. In the exemplary embodiment, the PID communicated from device manager 136*a* identifies device process 108*d* executed by remote call manager 26*c*. Route list control process 134 communicates the call request and requested port number to device process 108*d*, as indicated by arrow 416. This communication may be performed directly or indirectly using direct signaling, a tunneling trunk, or any other appropriate signaling method. Device process 108*d* communicates the call request to gateway 24*c*, as indicated by arrow 418.

If the requested port of gateway device 24*c* cannot accept the call request (for example, if it is already handling a maximum number of calls), device process 108*d* sends a call denial signal to route list control process 134*a*, and route list control process 134*a* offers the call request to the device process 108 associated with the next port listed in route group 124*a*. If no port of a gateway device 24 listed in route group 124*a* can accept the call, route list control process 134*a* begins sending the call request to gateway devices 24 and associated ports listed in route group 124*c*, the next route group 124 listed in route list 122*a*. This process is continued until the route list is exhausted or until a gateway device 24 accepts the call request. Alternatively, the ports in each route group 124 may be tried in parallel instead of sequentially. In this case, the first port to accept the call may be used to facilitate the call.

If the specified port of gateway 24*c* can accept the call, gateway 24*c* communicates the call request to telephony device 68*d* (for example, through Dallas central office 62*a*) to determine whether telephony device 68*d* can accept the call. If telephony device 68*d* can accept the call, gateway 24*c* communicates a call proceed signal to device process 108*d*, as indicated by arrow 420. Device process 108*d* communicates the call proceed signal to route process 134*a*, as indicated by arrow 422, and route list control process 134*a* communicates the call proceed signal to call control module 102*a*, as indicated by arrow 424. Call control module 102*a* communicates the call proceed signal to device process 108*a*, as indicated by arrow 426, and device process 108*a* communicates the call proceed signal to telephony device 22*a*, as indicated by arrow 428. As described above, telephony device 22*a* then establishes media streaming with gateway device 24*c* to begin communication with telephony device 68*d*.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for call routing, comprising:
   receiving a call request at a first call manager from a first telephony device coupled to a packet-based network, the call request including a telephone number associated with a second telephony device;
   accessing a route list associated with the telephone number to determine a port of a gateway device operable to transmit the call request to the second telephony device, wherein the route list comprises a plurality of route groups, each route group including a list of one or more ports of a plurality of gateway devices; and
   communicating the call request to a second call manager controlling the gateway device included in the route list.

2. The method of claim 1, further comprising:
   accessing a registration information table to determine a process identification (PID) of a route list control process executed by the first call manager and associated with the telephone number; and
   communicating the call request to the route list control process using the PID, the route list control process operable to access the route list.

3. The method of claim 1, wherein accessing a route list associated with the telephone number comprises accessing a route list to obtain the device name and a port number of the gateway device.

4. The method of claim 3, further comprising:
   communicating the device name of the gateway device to a device manager executed by the first call manager; and
   accessing a device name mapping table using the device manager to determine a PID of a first device process executed by the second call manager and controlling the gateway device.

5. The method of claim 4, wherein communicating the call request to a second call manager controlling the gateway device comprises communicating the call request and the port number to the first device process.

6. The method of claim 5, further comprising:
   communicating the call request and the port number from the first device process to the gateway device;
   receiving a call proceed signal from the gateway device indicating acceptance of the call request; and
   communicating the call proceed signal from the second call manager to the first call manager.

7. The method of claim 5, further comprising:
   communicating the call request and the port number from the first device process to the gateway device;
   receiving a call denial signal from the gateway device indicating a denial of the call request; and
   communicating the call denial signal from the second call manager to the first call manager.

8. A call manager coupled to a packet-based network and operable to control a plurality of telephony devices, comprising:
   a first device process controlling a first telephony device and operable to receive a call request from the first telephony device, the call request including a telephone number associated with a second telephony device;
   a call control module operable to receive the call request from the first device process; and
   a route list control process associated with the telephone number and operable to:
   receive the call request from the call control module;
   access an associated route list to determine a port of a gateway device operable to transmit the call request to the second telephony device, wherein the route list comprises a plurality of route groups, each route group including a list of one or more ports of a plurality of gateway devices; and
   communicate the call request to a second call manager coupled to the packet-based network and controlling the gateway device included in the route list.

9. The call manager of claim 8, further comprising:
   a digit analysis module operable to receive from the call control module the telephone number included in the call request, the digit analysis module further operable to access a registration information table to determine a process identification (PID) of the route list control process associated with the telephone number and to communicate the PID to the call control module; and wherein the call control module communicates the call request to the route list control process using the PID.

10. The call manager of claim 8, wherein the route list control process is operable to access the route list to obtain a device name and a port number of the gateway device.

11. The call manager of claim 10, further comprising a device manager operable to:

receive the device name of the gateway device from the route list control process;

access a device name mapping table to determine a PID of a second device process executed by the second call manager and controlling the gateway device; and communicate the PID of the second device process to the route list control process.

12. The call manager of claim 11, wherein the route list control process is operable to communicate the call request and the port number to the second device process using the PID.

13. The call manager of claim 12, wherein:

the route list control process is further operable to receive a call proceed signal from the second device process and to communicate the call proceed signal to the call control module; and the call control module is operable to establish media streaming between the first telephony device and the gateway device in response to receiving the call proceed signal.

14. The call manager of claim 12, wherein the route list control process is operable to:

receive a call denial signal from the second device process;

access the route list to obtain the device name and a port number of a second gateway device;

communicate the device name of the second gateway device to the device manager;

receive from the device manager a PID of a third device process executed by the second call manager and controlling the second gateway device; and communicate the call request and the port number to the third device process.

15. First call manager software encoded in one or more non-transitory computer-readable media and when executed operable to:

receive a call request from a first telephony device coupled to a packet-based network, the call request including a telephone number associated with a second telephony device;

access a route list associated with the telephone number to determine a port of a gateway device operable to transmit the call request to the second telephony device, wherein the route list comprises a plurality of route groups, each route group including a list one or more ports of a plurality of gateway devices; and communicate the call request to a second call manager software controlling the gateway device included in the route list.

16. The call manager software of claim 15, further operable to:

access a registration information table to determine a process identification (PID) of a route list control process executed by the first call manager software and associated with the telephone number; and communicate the call request to the route list control process using the PID, the route list control process operable to access the route list.

17. The call manager software of claim 15, further operable to access the route list to obtain the device name and a port number of the gateway device.

18. The call manager software of claim 17, further operable to access one or more of the route groups included in the route list to obtain the device name and port number of the gateway device.

19. The call manager software of claim 17, further operable to:

communicate the device name of the gateway device to a device manager executed by the first call manager software; and access a device name mapping table using the device manager to determine a PID of a first device process executed by the second call manager software and controlling the gateway device.

20. The call manager software of claim 19, wherein communicating the call request to second call manager software controlling the gateway device comprises communicating the call request and the port number to the first device process.

* * * * *